Patented June 21, 1949

2,473,522

UNITED STATES PATENT OFFICE 2,473,522

TREATMENT OF CRUDE OIL

Robert L. Harris, Cleveland, Ohio, assignor to The Standard Oil Company, Cleveland, Ohio, a corporation of Ohio No Drawing. Application March 29, 1945,
Serial No. 585,567

8 Claims. (Cl. 196—23)

This invention relates to the treatment of crude petroleum or crude oil, so that the sludge that settles therefrom will be sufficiently fluid to be pumpable at lower temperatures, and, more particularly to the mixing of a soap of an unsaturated acid with the crude oil prior to permitting it to settle to form a separate pumpable sludge phase.

When crude petroleum is allowed to stand in a storage tank or in a barge or other transportation vessel, a sludge phase settles; this phase contains dark oil, along with some water, dirt, and the like. It is desirable to take advantage of the phase separation to achieve a preliminary fractionation of the crude.

The sludge phase, as ordinarily formed, is solid or stiff and is not pumpable at lower temperatures, such as 65° to 32° F. These temperatures readily obtain under transportation conditions a large part of the year. It is difficult and expensive to remove the solid or stiff sludge, since it cannot be pumped out after the oil is pumped out. If left in a barge, for example, several per cent of the capacity thereof will be wasted.

Heretofore, processes have been proposed for removing the solidified sludge such as by pouring hot oil on the solid sludge, or chopping it out when cold. These are expensive and time consuming. Processes for suspending the sludge ingredients throughout the oil have been proposed also; these are undesirable because they do not permit the preliminary fractionation of the crude by means of settling.

It has now been found, and unexpectedly indeed, that the addition to the crude oil of a monovalent base soap of an unsaturated acid containing at least 10 carbon atoms preserves substantially all of the advantages of the inherent settling of the crude oil, and at the same time forms a sludge which is pumpable even at lower temperatures including those at which water freezes. The soap is advantageously preformed into a solution or suspension, such as in water, naphtha or crude oil, and this suspension added to the crude oil as it is being placed in the tank or barge.

The unsaturated acids of which the soap is composed include oleic acid, linoleic acid, and the acids in oils such as tall oil, corn oil and other unsaturated aliphatic acids containing at least 10 carbon atoms. Preferably, the acids of glyceride oils having an iodine number in the range of from 75 to 185 are used. The monovalent bases of which the soap is composed include sodium, potassium, lithium and ammonium, lower amines, etc. Of these, the ammonium soaps are particularly preferred.

A sufficient amount of the soap should be added to the crude oil, so that the resulting sludge will be pumpable at the prevailing lower temperatures, but the amount added should not be sufficient to cause suspension of the sludge throughout the crude oil or to prevent or interfere with the settling of the sludge phase from the rest of the crude oil. In general the range will be 0.01 to 0.2% by weight of the soap (on an anhydrous basis) based on the weight of the crude.

A preferred way of adding the soap is to form a suspension of the soap in a liquid such as water, naphtha or crude oil. This suspension is then added to the crude oil. Any amount of soap may be in the suspension which will stay sufficiently suspended in the liquid employed to permit its addition to the oil. The preferred amount is from about 5 to about 25 weight per cent of soap based on the liquid. The amount of the suspension added to the oil will depend on the temperature and the exact nature of the crude but will fall within the general range of 0.05 to 0.8 volume per cent of such a suspension based on the crude. Somewhat higher amounts may be used but they are uneconomical. Any other method may be employed as long as the soap becomes uniformly distributed in the crude oil. The soap may be added at any time prior to the settling and separation of the sludge.

In order to further point out and to illustrate some of the advantages of the invention, the following examples are included. These are not to be construed as limitations of the invention as otherwise disclosed herein, however. Compositions containing soap and crude mineral oil were made up and settled. The lower or sludge phase was tested for fluidity at 32° F. and at 65° F. The results given in the following table are representative.

Table

| Example No. | 1 | 2 | 3 | 4 | 5 |
|---|---|---|---|---|---|
| Additive: Soap | none | NH₄ soap of corn oil acids. | NH₄ oleate | NH₄ soap of tall oil acids. | K oleate. |
| Iodine No. of oil of acids from which soap is made. | do | 111-128 | 90 | 177 | 90. |
| Form | do | 20.7 weight per cent suspension of soap in water. | 20.0 weight per cent suspension of soap in naphtha. | 12.4 weight per cent of soap in water. | 20.0 weight per cent suspension of soap in water. |
| Amount of above suspension added in volume per cent based on volume of crude oil. | do | 0.40 | 0.30 | 0.40 | 0.40. |
| Characteristic of sludge at— 32° F. | stiff | completely fluid | completely fluid | partly fluid (pumpable). | partly fluid (pumpable). |
| 65° F. | do | do | do | completely fluid | completely fluid. |

In view of the above disclosure, variations and modifications thereof will become apparent to one skilled in the art. The invention includes all such modifications and variations as come within the scope of the following claims.

I claim:

1. A method of treating crude oil to enable the formation of a sludge which is pumpable at lower temperatures, which comprises mixing the crude oil with ammonium oleate and allowing the mixture to settle, the amount of the soap being sufficient to cause the sludge which settles to be pumpable at a temperature within the range of 32° to 65° F. but not sufficient to prevent the formation of such a sludge phase.

2. A method of treating crude oil to enable the formation of a sludge which is pumpable at lower temperatures, which comprises mixing the crude oil with the ammonium soap of corn oil acids and allowing the mixture to settle, the amount of said soap being sufficient to cause the sludge which settles to be pumpable at a temperature within the range of 32° to 65° F. but not sufficient to prevent the formation of such a sludge phase.

3. A method of treating crude oil to enable the formation of a sludge which is pumpable at lower temperatures, which comprises mixing the crude oil with the ammonium soap of tall oil acids and allowing the mixture to settle, the amount of said soap being sufficient to cause the sludge which settles to be pumpable at a temperature within the range of 32° to 65° F. but not sufficient to prevent the formation of such a sludge phase.

4. A method of treating crude oil to form a sludge which is pumpable at lower temperatures, which comprises mixing with the crude oil a suspension in an inert liquid of a monovalent base soap of an unsaturated fatty acid of at least 10 carbon atoms, the glyceride oil of said acid having an iodine number in the range 75 to 185 and the concentration of said soap in said suspension being in the range of 5 to 20 weight per cent, in an amount within the range of 0.05 to about 0.8 volume per cent to enable the formation of a sludge which is pumpable at lower temperatures and allowing the mixture to settle.

5. A method of treating crude oil to form a sludge which is pumpable at lower temperatures, which comprises mixing with the crude oil a suspension in an inert liquid of an ammonium soap of an unsaturated fatty acid of at least 10 carbon atoms, the glyceride oil of said acid having an iodine number in the range of 75 to 185 and the concentration of said soap in said suspension being in the range of 5 to 20 weight per cent, in an amount within the range of 0.05 to about 0.8 volume per cent to enable the formation of a sludge which is pumpable at lower temperatures and allowing the mixture to settle.

6. A method of treating crude oil to form a sludge which is pumpable at lower temperatures, which comprises mixing with the crude oil a 5 to 20 weight per cent suspension in an inert liquid of ammonium oleate, in an amount within the range of 0.05 to about 0.8 volume per cent to enable the formation of a sludge which is pumpable at lower temperatures and allowing the mixture to settle.

7. A method of treating crude oil to form a sludge which is pumpable at temperatures at which water freezes, which comprises mixing with the crude oil a 5 to 20 weight per cent suspension in an inert liquid of the ammonium soap of corn oil acids, in an amount within the range of 0.05 to about 0.8 volume per cent to enable the formation of a sludge which is pumpable at lower temperatures and allowing the mixture to settle.

8. A method of treating crude oil to form a sludge which is pumpable at temperatures at which water freezes, which comprises mixing with the crude oil a 5 to 20 weight per cent suspension in an inert liquid of the ammonium soap of tall oil acids, in an amount within the range of 0.05 to about 0.8 volume per cent to enable the formation of a sludge which is pumpable at lower temperatures and allowing the mixture to settle.

ROBERT L. HARRIS.

REFERENCES CITED

The following references are of record in the file of this patent:

UNITED STATES PATENTS

| Number | Name | Date |
|---|---|---|
| 1,460,718 | Hapgood | July 3, 1923 |
| 1,596,593 | De Groote | Aug. 17, 1926 |
| 1,820,295 | Bennett | Aug. 25, 1931 |

OTHER REFERENCES

Bureau of Mines, Reports of Investigations, Serial No. 2,688, May 1925, pages 1 to 15.

Dunstan et al., "Colloids in Petroleum . . . Industry," Jour. Soc. Chem. Ind. (Aug. 28, 1925), page 439.